United States Patent
Cronk

(10) Patent No.: US 10,357,811 B2
(45) Date of Patent: *Jul. 23, 2019

(54) METHODS OF USING HYDROGEN PEROXIDE FOR IN-SITU CHEMICAL OXIDATION TREATMENT OF SOIL AND GROUNDWATER

(71) Applicant: Gary Cronk, Santa Ana, CA (US)

(72) Inventor: Gary Cronk, Santa Ana, CA (US)

(*) Notice: Subject to any disclaimer, the term of this patent is extended or adjusted under 35 U.S.C. 154(b) by 429 days.

This patent is subject to a terminal disclaimer.

(21) Appl. No.: 15/011,174

(22) Filed: Jan. 29, 2016

(65) Prior Publication Data

US 2016/0144413 A1 May 26, 2016

Related U.S. Application Data

(62) Division of application No. 13/942,957, filed on Jul. 16, 2013, now Pat. No. 9,259,771.

(51) Int. Cl.
*B09C 1/00* (2006.01)
*B09C 1/08* (2006.01)
(Continued)

(52) U.S. Cl.
CPC .............. *B09C 1/08* (2013.01); *B09C 1/00* (2013.01); *B09C 1/002* (2013.01); *C02F 1/722* (2013.01);
(Continued)

(58) Field of Classification Search
CPC ... B09C 1/00; B09C 1/002; B09C 1/08; C02F 1/722; C02F 1/725; C02F 2103/06; C02F 2209/02; C02F 2209/03
See application file for complete search history.

(56) References Cited

U.S. PATENT DOCUMENTS

2008/0207981 A1* 8/2008 Hoag .................. B09C 1/08
588/320
2009/0299123 A1* 12/2009 Innocenti ............ B09C 1/08
588/315

OTHER PUBLICATIONS

Watts et al., "Enhanced stability of hydrogen peroxide in the presence of subsurface solids," Journal of Contaminant Hydrology, 91, (2007), 312-326.*

(Continued)

*Primary Examiner* — Lucas A Stelling
(74) *Attorney, Agent, or Firm* — Buche & Associates, P.C.; John K. Buche; Bryce A. Johnson

(57) ABSTRACT

Disclosed are methods of custom stabilization of the hydrogen peroxide used in the safe in-situ treatment of soil and groundwater. In one embodiment, disclosed is a method of in-situ chemical oxidation treatment of soil and/or groundwater wherein the hydrogen peroxide has been stabilized with carboxylate salt (e.g., sodium citrate, sodium malonate, or sodium phytate). Procedurally, chemical daylighting is avoided by: (a) mixing a batch of aqueous hydrogen peroxide solution with a carboxylate salt; (b) injecting the solution into a subterranean location; (c) allowing iron that is naturally present in the in-situ environment to mix with the solution; (d) controlling the subsurface pressure and temperature within the in-situ environment; (e) manipulating the concentration of carboxylate salt in the remainder of the hydrogen peroxide batch (as necessary), wherein the concentration of carboxylate salt defines the life-span of the hydrogen peroxide, and helps to control the subsurface reaction and minimize the possibility of chemical daylighting.

8 Claims, 2 Drawing Sheets

(51) Int. Cl.
*C02F 1/72* (2006.01)
*C02F 103/06* (2006.01)
(52) U.S. Cl.
CPC .......... *C02F 1/725* (2013.01); *C02F 2103/06* (2013.01); *C02F 2209/02* (2013.01); *C02F 2209/03* (2013.01)

(56) References Cited

OTHER PUBLICATIONS

Cronk, Gary, P.E., "Optimization of a Chemical Oxidation Treatment Train Process for Underground Remediation," Presentation at the Battelle 5th International Conference on Remediation of Chlorinated and Recalcitrant Compounds, (2006), pp. 1-7.*

* cited by examiner

METHODS OF USING HYDROGEN PEROXIDE FOR IN-SITU CHEMICAL OXIDATION TREATMENT OF SOIL AND GROUNDWATER

CROSS-REFERENCE TO RELATED APPLICATIONS

This application is a continuation of U.S. application Ser. No. 13/942,957.

STATEMENT REGARDING FEDERALLY SPONSORED RESEARCH OR DEVELOPMENT

Not applicable.

BACKGROUND OF THE INVENTION

Field of Invention

The subject matter of this disclosure is in the general field of uses of stabilized hydrogen peroxide. More specifically, said subject matter is in the field of methods for using stabilized hydrogen peroxide for in-situ chemical oxidation treatment of soil and/or groundwater.

Background of the Invention

Fenton's reaction is hydrogen peroxide that is catalyzed by Ferrous Iron (II) at a pH of 3.5 to 5.0 units. The Fenton's reaction is also known as catalyzed hydrogen peroxide ("CHP"). Chemically, hydrogen peroxide molecules in the solution are catalytically converted into hydroxyl radicals, water, and oxygen gas. The generated hydroxyl radicals can destroy a wide variety of organic compounds and, as a result, CHP is used for environmental remediation by in-situ chemical oxidation of soil and/or ground water contaminants (see e.g., U.S. Pat. No. 5,520,483 by Vigneri (circa 1996)).

Problems arise during use of CHP for in-situ soil and water treatment. First, production of the hydroxyl radicals by CHP produces a significant amount of oxygen gas and the reaction is extremely exothermic. In-situ temperatures over 220 degrees Fahrenheit have been measured during the catalyzation of 17.5% peroxide, while temperatures as high as 186 degrees F. have been recorded during catalyzation of 10% peroxide. Said exothermic reaction and production of oxygen gas can create health and safety issues when injected into the subsurface during in-situ soil and water treatment because subsurface pressures can rapidly build-up wherein the peroxide and contaminants may be forced upward to the ground surface (a phenomena known as chemical "daylighting"). Second, the lifespan of the hydrogen peroxide in a CHP reaction is short (typically less than twenty-four hours) so that the total amount of hydrogen peroxide may be entirely consumed prior to complete dispersion thereof into the in-situ treatment area. Without complete disbursement, a limited destruction of VOC contaminants in the in-situ area will occur. Thus, a need exists for methods of employing stabilized peroxide for in-situ soil and ground water treatment, wherein health and safety issues are controlled, the risk of chemical daylighting is reduced, and the hydrogen peroxide lifespan is increased (i.e., stabilized).

Not surprisingly, some have discovered ways to employ peroxide for in-situ soil or water treatment using various types of stabilized hydrogen peroxide. For instance: U.S. Pat. No. 6,319,328 by Watts, et al. (circa 2001) and U.S. Pat. No. 8,366,350 by Swearingen et al. disclose use of hydrogen peroxide that is stabilized by adding phosphoric acid and monopotassium phosphate to chelate the iron; U.S. Pat. No. 5,130,053 by Feasey, et al. discloses the concept of stabilizing concentrated hydrogen peroxide via incorporation of sodium or potassium salts; U.S. Pat. No. 5,741,427 by Watts, et al. discloses a method of treating contaminants in soil or ground water by using an oxidizing agent with various phosphates and iron; U.S. Pat. No. 8,178,742 by Innocenti, et al. discloses use of hydrogen peroxide for in-situ treatments of soil or ground water with iron chelates by diffusing the area for six to forty-eight hours with a chelating agent prior to introduction of the peroxide; and other known methods or processes for in-situ treatment of soil and ground water use hydrogen peroxide stabilized by chelating the Iron via Ethylenediamine tetraacetic acid ("EDTA") or Phosphate based chelating agents.

Although, these known ways for stabilizing the hydrogen peroxide for in-situ treatment of soil or ground water may result in extended peroxide lifespans (albeit not well defined), the same rely on iron chelates and other chemicals that are not entirely safe or optimal for in-situ soil and ground water treatment. For instance, EDTA breaks down into nitrilotriacetic acid ("NTA"), which is a suspected carcinogen. Similarly, phosphate based chelating agents, including phosphonates, are considered fresh water contaminants and cause eutrophication in lakes and rivers. Other chelating agents are complex and expensive. Finally, the known methods of in-situ soil and ground water treatment using stabilized peroxide do not account for variable in-situ environments and do not include continual measurement and control of subsurface pressure and temperature whereby treatments cannot be customized. Thus, a need remains for methods of employing stabilized hydrogen peroxide for customized in-situ treatments of soil and ground water that (a) minimize the potential for health and safety concerns of chemical daylighting and (b) increase hydrogen peroxide lifespans.

SUMMARY OF THE INVENTION

In view of the foregoing, it is an objective of this disclosure to describe methods of custom stabilization of the hydrogen peroxide of CHP used in healthy and safe in-situ treatment of soil and ground water. In one embodiment, disclosed is a method of in-situ chemical oxidation treatment of soil and/or groundwater wherein hydrogen peroxide has been stabilized with carboxylate salt (e.g., sodium citrate, sodium malonate, or sodium phytate). Procedurally, chemical daylighting is avoided by: (a) mixing a batch of aqueous hydrogen peroxide solution at ten percent concentration with a carboxylate salt; (b) injecting the solution into a subterranean location; (c) allowing iron that is naturally present in the in-situ environment to mix with the solution to result in a CHP reaction; (d) controlling the subsurface pressure (20 to 30 pounds per square-inch (psi)) and temperature (100 to 120 degrees Fahrenheit) within the in-situ environment; (e) manipulating the concentration of carboxylate salt in the remainder of the hydrogen peroxide batch (as necessary), wherein the concentration of carboxylate salt defines the life-span of the hydrogen peroxide, and helps to control the subsurface reaction and minimizes the possibility of chemical daylighting.

In a preferred mode of operation: (1) a batch of aqueous hydrogen peroxide solution (ten percent) with a carboxylate salt is prepared; (2) a portion of the solution is injected to the in-situ environment either by "direct push" or by injecting the solution into injection wells drilled into the in-situ area ("injection well"); (3) naturally occuring iron within the subsurface initiates a CHP reaction; (4) the subsurface temperature is recorded via a thermocouple and datalogger and pressure is recorded via a pressure gauge; (5) an increasing dose of a carboxylate stabilizer (e.g., Sodium Citrate, Sodium Malonate, or Sodium Phytate) is provided to the remainder of the batch; and, (6) the process is repeated using the remainder so that pressure is maintained between 20 to 30 psi and temperature between 100 and 120 degrees Fahrenheit. The process can be used with or without sodium persulfate (as a secondary oxidation agent) with the persulfate being mixed and injected separately from the hydrogen peroxide solution (persulfate is typically injected first).

BRIEF DESCRIPTION OF THE FIGURES

Other objectives of the invention will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of the disclosed apparatus and are therefore not to be considered limiting of its scope, for the invention may admit to other equally effective embodiments that will be appreciated by those reasonably skilled in the relevant arts.

DETAILED DESCRIPTION OF PREFERRED EMBODIMENTS

Disclosed are methods of custom stabilization of the hydrogen peroxide used in healthy and safe in-situ treatment of soil and ground water. In one embodiment, disclosed is a method of in-situ chemical oxidation treatment of soil and/or groundwater using CHP wherein the hydrogen peroxide has been stabilized with carboxylate salt (e.g., sodium citrate, sodium malonate, or sodium phytate). Procedurally, chemical daylighting is avoided by: (a) mixing a batch of aqueous hydrogen peroxide solution at ten percent concentration with a carboxylate salt; (b) injecting the solution into a subterranean location, wherein the injection flow rate is maintained at a level of one gallon per minute or lower; (c) allowing iron that is naturally present in the in-situ environment to mix with the solution to result in a CHP reaction; (d) controlling the subsurface pressure (20 to 30 pounds per square-inch (psi)) and temperature (100 to 120 degrees Fahrenheit) within the in-situ environment; (e) manipulating the concentration of carboxylate salt in the remainder of the hydrogen peroxide batch (as necessary), wherein the concentration of carboxylate salt defines the life-span of the hydrogen peroxide, and helps to control the subsurface reaction and the possibility of chemical daylighting.

Figure 1:
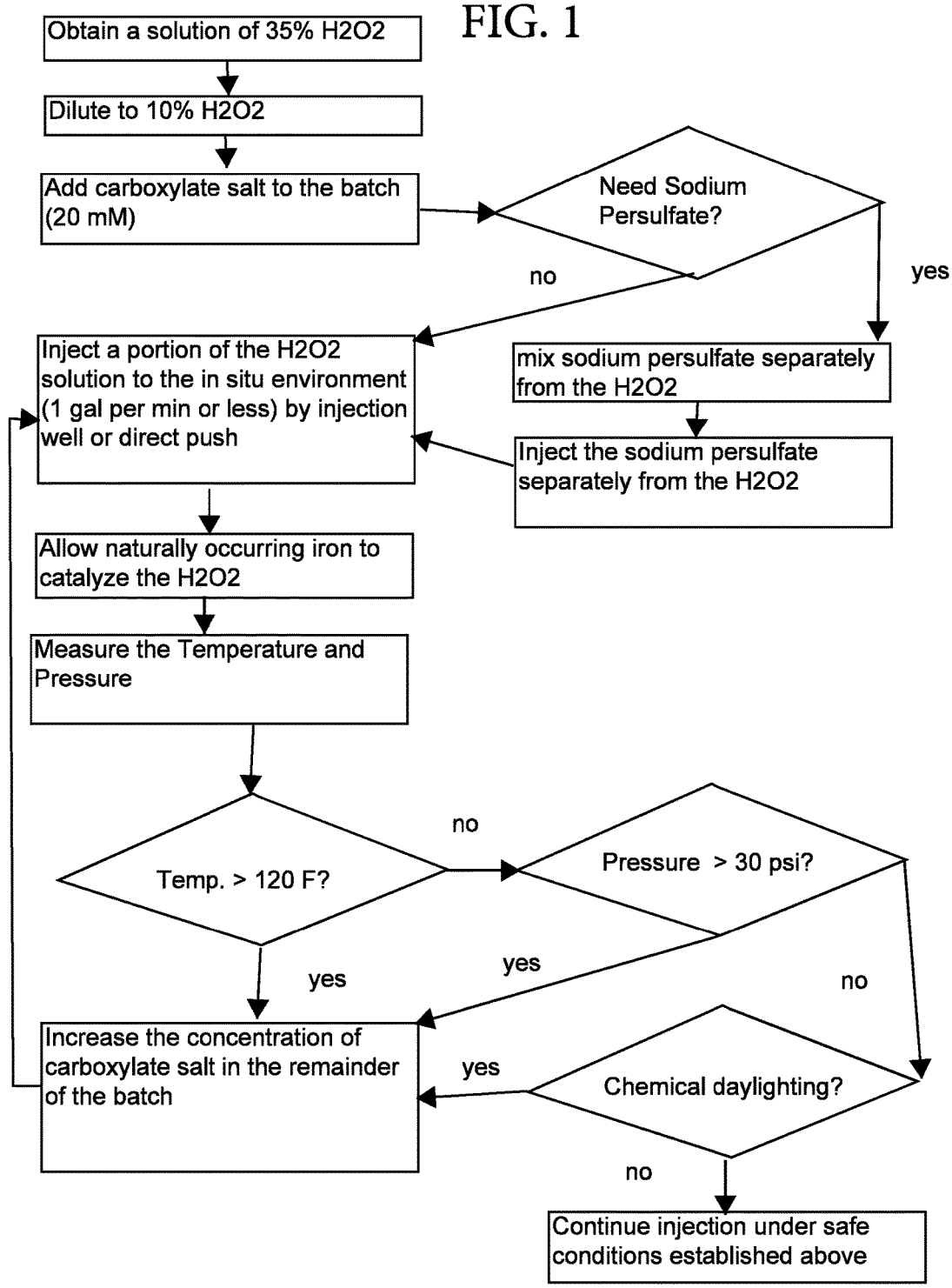
FIG. 1 is a flow chart of the disclosed method of using stabilized hydrogen peroxide for direct push in situ chemical oxidation treatment of soil or ground water; and, FIG. 2 is a graph of hydrogen peroxide persistence using stabilized hydrogen peroxide versus CHP.

FIG. 1 may be a flow chart of the disclosed method of injecting stabilized hydrogen peroxide using direct push for in-situ chemical oxidation treatment of soil or ground water. Referring to that figure, a preferred field mode of operation involves the following steps: (1) starting with a 35% concentrated aqueous solution of hydrogen peroxide; (2) diluting the solution with water until the concentration of hydrogen peroxide is 10%; (3) mixing separately an aqueous solution of carboxylate salt; (4) mixing the solution of carboxylate salt with the batch of ten percent hydrogen peroxide solution until the batch has an initial concentration of carboxylate salt (e.g., twenty milli-moles per mole of peroxide or as determined by treatability testing); (5) injecting a portion of the batch to the in-situ environment by direct push injection, wherein a rod with a retractable tip exposing a two-foot perforated interval is driven underground below the water table and wherein said portion is injected into the groundwater; (6) measuring the pressure during injection; (7) allowing the natural iron or other metals within the injection area to initiate a CHP reaction; (8) measuring the temperature via thermocouple near the injection point; (9) IF the temperature is above 120 degrees Fahrenheit, the pressure is above 30 psi, or daylighting occurs THEN the concentration of carboxylate salt in the remainder of the batch is increased for further stabilization of the hydrogen peroxide and the process is repeated, and, optionally, ELSE IF the temperature is below 120 degrees Fahrenheit, the pressure is below 30 psi, and no daylighting occurs THEN the concentration of carboxylate salt in the remainder of the batch is deemed satisfactory and safe. Suitably, the injection tip may be raised in two feet increments so that various portions of the batch may be injected into various depths within the aqueous environment. The process can be used with or without sodium persulfate (as a secondary oxidation agent) with the persulfate being mixed and injected separately from the hydrogen peroxide (persulfate is typically injected prior to the peroxide). In this mode of operation: the addition of acid is not necessary in the conventional use of SHP, since the acidity of the peroxide and the carboxylate salt will decrease the pH of the groundwater to a level of 3.0 to 5.0 pH units and allow for a catalyzed peroxide reaction; and, the addition of ferrous iron or chelated iron is not necessary in the conventional use of SHP, as the naturally occurring levels of iron in the groundwater and soil are normally sufficient to initiate a catalyzed peroxide reaction.

FIG. 1 may also be a flow chart of the disclosed method of injecting stabilized hydrogen peroxide by injection well for in situ chemical oxidation treatment of soil or groundwater. Referring to that figure, a preferred mode of field operation involves the following steps: (1) starting with a batch a 35% concentrated aqueous solution of hydrogen peroxide; (2) diluting the solution with water until the concentration of hydrogen peroxide is 10%; (3) mixing separately an aqueous solution of carboxylate salt; (4) mixing the solution of carboxylate salt with the batch of 10% hydrogen peroxide solution until the batch has an initial concentration of carboxylate salt (e.g., twenty milli-moles per mole of peroxide or as determined by treatability testing); (5) injecting a portion of the batch to the in-situ environment by injection well, wherein a 2" well-casing is provided with a ½" stinger pipe to allow for injection below the underground water table wherein the injection flow rate is maintained at a level of one gallon per minute or less; (6) allowing the natural iron or other metals within the injection area to initiate a CHP reaction; (7) measuring the pressure of injection; (8) measuring the temperature via thermocouple near the injection point; (9) measuring the back pressure due to build-up of oxygen gas within the casing; (10) IF the temperature is above 120 degrees Fahrenheit, the pressure is above 30 psi, or daylighting occurs THEN the concentration of carboxylate salt in the remainder of the batch is increased for further stabilization of the hydrogen peroxide and the process is repeated, ELSE IF the temperature is below 120 degrees Fahrenheit or the pressure is below 30 psi, or no daylighting occurs THEN the concentration of carboxylate salt in the remainder of the batch is deemed satisfactory and safe. In this mode of operation: the addition of acid is not necessary in the conventional use of SHP, since the acidity of the peroxide and the carboxylate salt will decrease the pH of the groundwater to a level of 3.0 to 5.0 pH units and allow for a catalyzed peroxide reaction; and, the addition of ferrous iron or chelated iron is not necessary in the conventional use of SHP, as the naturally occurring levels of iron in the groundwater and soil are normally sufficient to initiate a catalyzed peroxide reaction.

Figure 2:
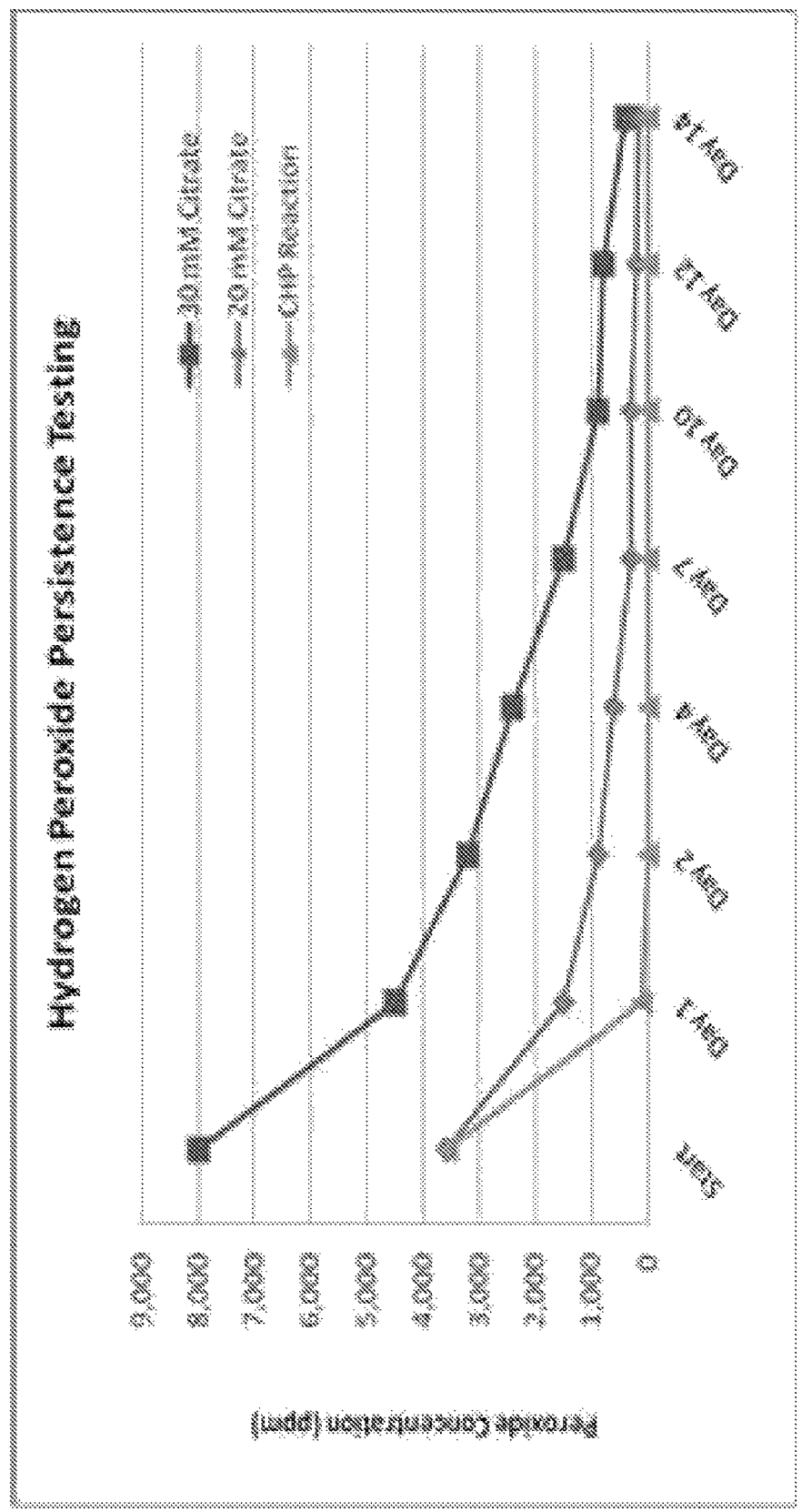

FIG. 2 is a graph of hydrogen peroxide persistence using stabilized peroxide versus CHP. The line with square datapoints illustrates a twelve-day lifespan of hydrogen peroxide during use of stabilized hydrogen peroxide in a CHP reaction with 30 mM of Citrate; the line with diamond datapoints shows a seven-day hydrogen peroxide lifespan during a CHP reaction with 20 mM Citrate; and the line with triangular data points illustrates a one-day lifespan of hydrogen peroxide in CHP with no stabilizer. As shown, the lifespan of hydrogen peroxide can be increased from 1 day to 12 days by using increasing doses of sodium citrate. The stabilization of peroxide ultimately depends on the amount of available iron in the environment. This means that higher iron levels (e.g., over 40 mg/L) may require an increased dose of sodium citrate to extend the lifespan of the peroxide.

It should be noted that this disclosure describes a preferred embodiment and is not intended to be limiting of the possible embodiments that could be used to accomplish the invented aeroponic systems. Those of skill in the art may readily appreciate other useful and equally preferred embodiments of the disclosed aeroponic system after reading this disclosure and such embodiments would not depart from the spirit and intent of this disclosure. For instance carboxylate salts can include: Sodium Citrate; Sodium Malonate; and Sodium Phytate.

I claim:

1. A method of in-situ chemical oxidation comprising the steps of:
    (a) mixing an aqueous hydrogen peroxide solution at approximately ten percent concentration with a carboxylate salt;
    (b) injecting a portion of the solution into a subsurface in-situ environment;
    (c) allowing iron that is present in the in-situ environment to catalyst the hydrogen peroxide in the solution; and
    (d) measuring or observing a condition in the in-situ environment;
    (e) controlling said condition within the in-situ environment; and
    (f) manipulating the concentration of carboxylate salt in a remainder of the solution.

2. The method of claim 1 wherein the condition is selected from the group consisting of temperature, pressure, and chemical daylighting.

3. The method of claim 2 wherein the condition is temperature and the concentration of carboxylate salt in the remainder of the solution is increased at a temperature exceeding one hundred and twenty degrees.

4. The method of claim 1 wherein said solution is injected via direct push injection.

5. The method of claim 4 wherein the condition is selected from the group consisting of temperature, pressure, and chemical daylighting.

6. The method of claim 4 wherein the condition is temperature and the concentration of carboxylate salt in the remainder of the solution is increased at a temperature exceeding one hundred and twenty degrees.

7. The method of claim 1 wherein said solution is injected via injection wells.

8. The method of claim 7 wherein the condition is selected from the group consisting of temperature, pressure, and chemical daylighting.

* * * * *